US009092461B1

(12) United States Patent  
Suldhal

(10) Patent No.: US 9,092,461 B1  
(45) Date of Patent: Jul. 28, 2015

(54) SYSTEM AND METHOD FOR TIERING DATA STORAGE

(75) Inventor: Dayanand Suldhal, New Canaan, CT (US)

(73) Assignee: EMC Corporation, Hopkinton, MA (US)

( * ) Notice: Subject to any disclaimer, the term of this patent is extended or adjusted under 35 U.S.C. 154(b) by 133 days.

(21) Appl. No.: 13/539,423

(22) Filed: Jun. 30, 2012

(51) Int. Cl.
*G06F 17/30* (2006.01)

(52) U.S. Cl.
CPC ............................... *G06F 17/30286* (2013.01)

(58) Field of Classification Search
CPC ............ G06F 17/30286; G06F 17/30067; G06F 17/30578; G06F 3/30689; G06F 3/067; G06F 13/1689
USPC ......... 707/609, 613, 618, 636, 651, 653, 654, 707/665, 667, 668, 805, 809, 812, 821, 822, 707/823, 824, 779, 661, 671; 711/158, 160, 711/161, 162, 165, 100, 112, 113, 114, 117, 711/118, 122, 167
See application file for complete search history.

(56) References Cited

U.S. PATENT DOCUMENTS

| | | | |
|---|---|---|---|
| 6,209,029 B1 * | 3/2001 | Epstein et al. ................. | 709/219 |
| 8,555,018 B1 | 10/2013 | Rohr et al. | |
| 2003/0009621 A1 | 1/2003 | Gruner et al. | |
| 2006/0053261 A1 | 3/2006 | Prahlad et al. | |
| 2007/0011420 A1 | 1/2007 | Boss et al. | |
| 2008/0104350 A1 | 5/2008 | Shimizu et al. | |
| 2009/0030953 A1 * | 1/2009 | Fukuda et al. ................. | 707/203 |
| 2011/0010514 A1 | 1/2011 | Benhase et al. | |
| 2011/0231596 A1 | 9/2011 | Goss et al. | |
| 2012/0078931 A1 | 3/2012 | Jaquette | |
| 2012/0079223 A1 | 3/2012 | Jaquette | |
| 2012/0110259 A1 * | 5/2012 | Mills et al. .................... | 711/113 |
| 2012/0179886 A1 * | 7/2012 | Prahlad et al. ................. | 711/162 |
| 2012/0239691 A1 | 9/2012 | Jaquette | |
| 2012/0239860 A1 | 9/2012 | Atkisson et al. | |
| 2012/0278569 A1 * | 11/2012 | Kawakami et al. ........... | 711/162 |
| 2013/0111171 A1 * | 5/2013 | Hirezaki et al. .............. | 711/165 |
| 2013/0179479 A1 * | 7/2013 | Chakra et al. ................. | 707/822 |
| 2013/0254483 A1 * | 9/2013 | Iida ................................ | 711/117 |
| 2013/0290598 A1 | 10/2013 | Fiske et al. | |

OTHER PUBLICATIONS

Emaru et al., Performance Management for the Dynamic Storage Tiering by Virtual Volume Clustering, Utility and Cloud Computing (UCC), 2011 Fourth IEEE International Conference on, DOI: 10.1109/UCC.2011.74, Publication Year: 2011, pp. 451-456.*
Non-Final Office Action in U.S. Appl. No. 13/539,427, mailed Nov. 20, 2013.
Final Office Action in U.S. Appl. No. 13/539,427, mailed Apr. 22, 2014.

* cited by examiner

*Primary Examiner* — Greta Robinson
(74) *Attorney, Agent, or Firm* — Brian J. Colandreo, Esq.; Mark H. Whittenberger, Esq.; Holland & Knight LLP

(57) ABSTRACT

A method, computer program product, and computing system for rendering a user interface screen that is accessible by a user of a storage system. The storage system includes a plurality of data tiers. An indication is received, via the user interface screen, that identifies a data portion to be retiered and a future point-in-time when the data portion will be retiered amongst the plurality of data tiers. At the future point-in-time, the retiering of the data portion is effectuated amongst the plurality of data tiers.

21 Claims, 8 Drawing Sheets

FIG. 5A user interface 300

| Data Portion: | LUN 200 | — 302 |
| From: | tier 104 | — 306 |
| To: | tier 102 | — 308 |
| Date / Time: | 23 June 2012 @ 12:00 a.m. | — 304 |

[submit] — 310, 312
[cancel]

FIG. 5B user interface 300

| Data Portion: | LUN 200 | — 302 |
| From: | tier 102 | — 306 |
| To: | tier 104 | — 308 |
| Date / Time: | 01 July 2012 @ 12:00 a.m. | — 304 |

[submit] — 310, 312
[cancel]

user interface 450

| Data Portion | LUN 202 | 452 |
| From: | tier 104 | 454 |
| To: | tier 124 | 456 |
| Date / Time: | immediately | 458 |

460
312
submit
cancel

FIG. 8

# SYSTEM AND METHOD FOR TIERING DATA STORAGE

TECHNICAL FIELD

This disclosure relates to storage devices and, more particularly, to multitier storage devices.

BACKGROUND

Storing and safeguarding electronic content is of paramount importance in modern business. Accordingly, various systems may be employed to protect such electronic content. Data storage system are often compartmentalized into different tiers having different levels of performance, wherein data that is accessed less often is placed into a slower performance tier, while data that is accessed more often is placed into a higher performance tier. Unfortunately, data is often present in a first tier (e.g., a slower tier) when it should have actually been present in a faster tier.

SUMMARY OF DISCLOSURE

In a first implementation, a computer-implemented method includes rendering a user interface screen that is accessible by a user of a storage system. The storage system includes a plurality of data tiers. An indication is received, via the user interface screen, that identifies a data portion to be retiered and a future point-in-time when the data portion will be retiered amongst the plurality of data tiers. At the future point-in-time, the retiering of the data portion is effectuated amongst the plurality of data tiers.

One or more of the following features may be included. The future point-in-time may define a time and/or date at which the data portion will be uptiered from a slower data tier to a faster data tier included within the plurality of data tiers. The future point-in-time may define a time and/or date at which the data portion will be downtiered from a faster data tier to a slower data tier included within the plurality of data tiers. The future point-in-time may define a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

The plurality of data tiers may include a first data tier, a second data tier, and a third data tier. The first data tier may include one or more flash storage devices, the second data tier may include one or more fiber channel storage devices, and the third data tier may include one or more SATA storage devices. The storage system may include a data array.

In another implementation, a computer program product residing on a computer readable medium having a plurality of instructions stored thereon which, when executed by a processor, cause the processor to perform operations including rendering a user interface screen that is accessible by a user of a storage system. The storage system includes a plurality of data tiers. An indication is received, via the user interface screen, that identifies a data portion to be retiered and a future point-in-time when the data portion will be retiered amongst the plurality of data tiers. At the future point-in-time, the retiering of the data portion is effectuated amongst the plurality of data tiers.

One or more of the following features may be included. The future point-in-time may define a time and/or date at which the data portion will be uptiered from a slower data tier to a faster data tier included within the plurality of data tiers. The future point-in-time may define a time and/or date at which the data portion will be downtiered from a faster data tier to a slower data tier included within the plurality of data tiers. The future point-in-time may define a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

The plurality of data tiers may include a first data tier, a second data tier, and a third data tier. The first data tier may include one or more flash storage devices, the second data tier may include one or more fiber channel storage devices, and the third data tier may include one or more SATA storage devices. The storage system may include a data array.

In another implementation, a computing system including at least one processor and at least one memory architecture coupled with the at least one processor, wherein the computing system is configured to perform operations including rendering a user interface screen that is accessible by a user of a storage system. The storage system includes a plurality of data tiers. An indication is received, via the user interface screen, that identifies a data portion to be retiered and a future point-in-time when the data portion will be retiered amongst the plurality of data tiers. At the future point-in-time, the retiering of the data portion is effectuated amongst the plurality of data tiers.

One or more of the following features may be included. The future point-in-time may define a time and/or date at which the data portion will be uptiered from a slower data tier to a faster data tier included within the plurality of data tiers. The future point-in-time may define a time and/or date at which the data portion will be downtiered from a faster data tier to a slower data tier included within the plurality of data tiers. The future point-in-time may define a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

The plurality of data tiers may include a first data tier, a second data tier, and a third data tier. The first data tier may include one or more flash storage devices, the second data tier may include one or more fiber channel storage devices, and the third data tier may include one or more SATA storage devices. The storage system may include a data array.

The details of one or more implementations are set forth in the accompanying drawings and the description below. Other features and advantages will become apparent from the description, the drawings, and the claims.

BRIEF DESCRIPTION OF THE DRAWINGS

FIGS. 5A-5B are diagrammatic views of user interfaces rendered by the data tiering process of FIG. 1;

FIG. 8 is a diagrammatic view of a user interface rendered by the data tiering process of FIG. 1.

Like reference symbols in the various drawings indicate like elements.

DETAILED DESCRIPTION OF THE PREFERRED EMBODIMENTS

Figure 1:
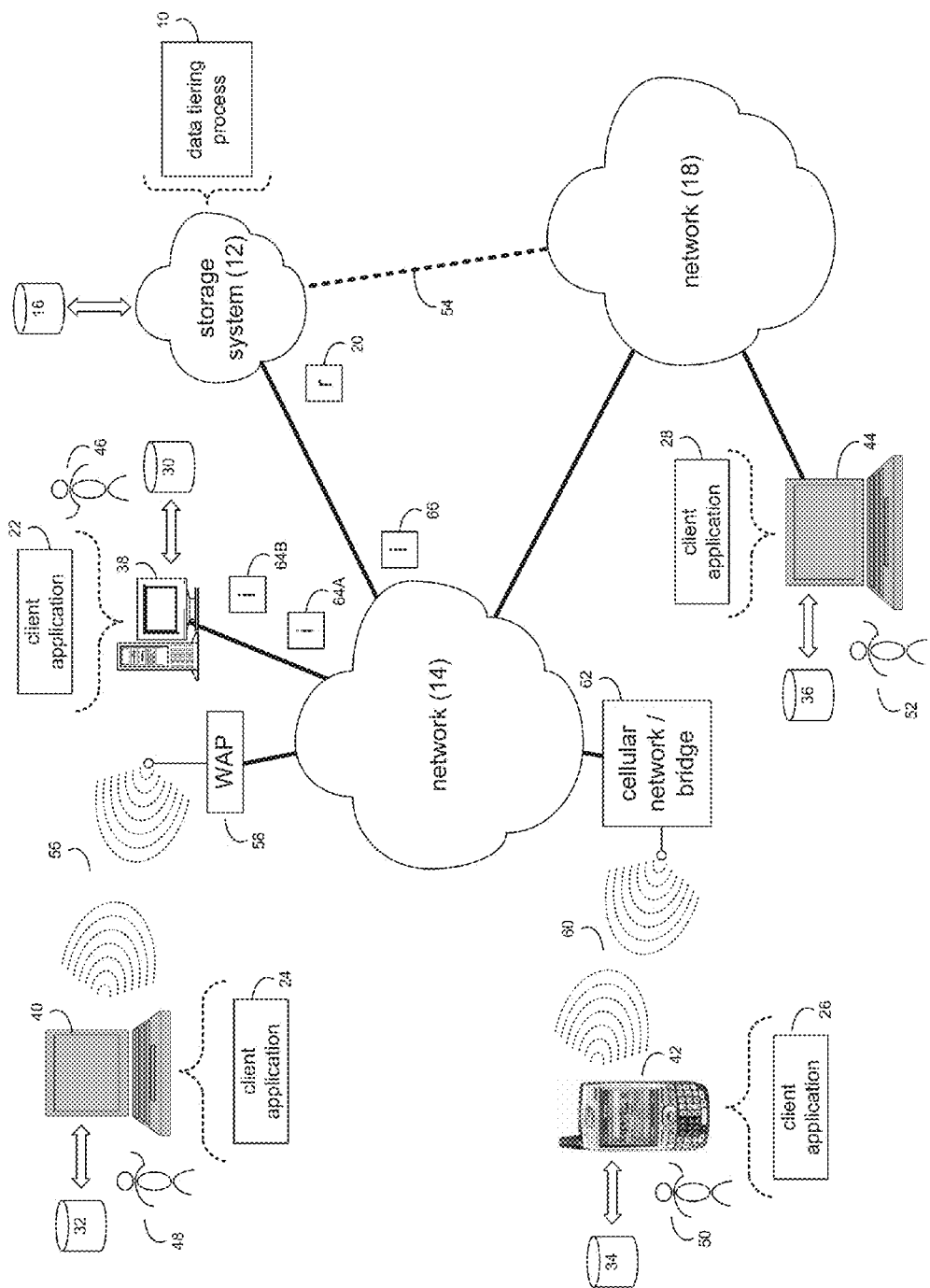
FIG. 1 is a diagrammatic view of a storage system and a data tiering process coupled to a distributed computing network.

System Overview:

Referring to FIG. 1, there is shown data tiering process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data tiering process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
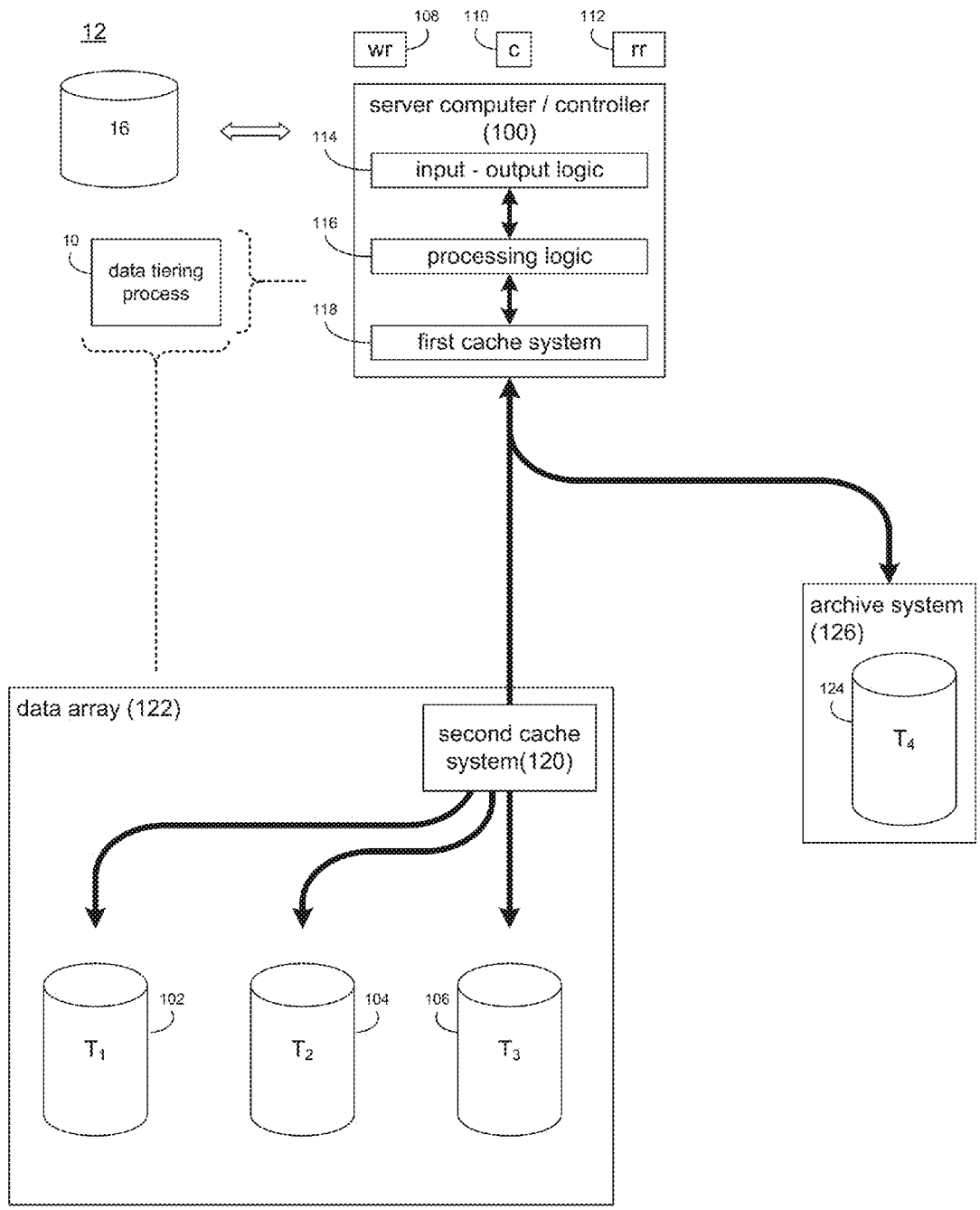
FIG. 2 is a diagrammatic view of the storage system of FIG. 1.

Referring also to FIG. 2, storage system 12 may include a server computer/controller (e.g. server computer/controller 100), and a plurality of data tiers $T_{1-n}$ (e.g. data tiers 102, 104, 106). Data tiers 102, 104, 106 may be configured to provide various levels of performance. For example, one or more of data tiers 102, 104, 106 may be configured to be a lower performance data tier and one or more of data tiers 102, 104, 106 may be configured to be a higher performance data tier.

For example, data tier 102 may be configured as a higher performance data tier and may include one or more flash storage devices. Data tier 104 may be configured as a medium performance data tier and may include one or more fiber channel storage devices. And data tier 104 may be configured as a lower performance data tier and may include one or more lower performance storage devices (e.g., SATA drives, SCSI drives, SAS drives, IDE drives, and EIDE drives).

One or more of data tiers 102, 104, 106 may be configured to provide various levels of performance and/or high availability. For example, one or more of data tiers 102, 104, 106 may be configured as a RAID 0 array, in which data is striped across multiple drives. By striping data across multiple drives, improved performance may be realized. However, RAID 0 arrays do not provide a level of high availability. Accordingly, one or more of data tiers 102, 104, 106 may be configured as a RAID 1 array, in which data is mirrored between multiple drives. By mirroring data between multiple drives, a level of high availability is achieved as multiple copies of the data are stored within storage system 12.

While data tiers 102, 104, 106 are discussed above as possibly being configured in a RAID 0 or RAID 1 array, this is for illustrative purposes only and is not intended to be a limitation of this disclosure, as other configurations are possible. For example, data tiers 102, 104, 106 may be configured in a non-RAID fashion or as a RAID 3, RAID 4, RAID 5 or RAID 6 array.

While in this particular example, storage system 12 is shown to include three data tiers (e.g. data tiers 102, 104, 106), this is for illustrative purposes only and is not intended to be a limitation of this disclosure. Specifically, the actual number of data tiers may be increased or decreased depending upon system needs.

As discussed above, data tiers 102, 104, 106 may include one or more one or more flash storage devices, fiber channel storage devices, and lower performance storage devices (e.g., SATA drives, SCSI drives, SAS drives, IDE drives, and EIDE drives).

Storage system 12 may execute all or a portion of data tiering process 10. The instruction sets and subroutines of data tiering process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 108 (i.e. a request that content 110 be written to storage system 12) and data read request 112 (i.e. a request that content 110 be read from storage system 12).

Server computer/controller 100 may include input-output logic 114 (e.g., a network interface card or a Host Bus Adaptor (HBA)), processing logic 116, and first cache system 118. Examples of first cache system 118 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 110 to be written to storage system 12 may be received by input-output logic 114 (e.g. from network 14 and/or network 18) and processed by processing logic 116. Additionally/alternatively and when server computer/controller 100 is configured as an application server, content 110 to be written to storage system 12 may be internally generated by server computer/controller 100. As will be discussed below in greater detail, processing logic 116 may initially store content 110 within first cache system 118.

Depending on the manner in which first cache system 118 is configured, processing logic 116 may immediately write content 110 to second cache system 120/data tiers 102, 104, 106 (if first cache system 118 is configured as a write-through cache) or may subsequently write content 110 to second cache system 120/data tiers 102, 104, 106 (if first cache system 118 is configured as a write-back cache). Examples of second cache system 120 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 120 and data tiers 102, 104, 106 may form data array 122, wherein first cache system 118 may be sized so that the number of times that data array 122 is accessed may be reduced. Accordingly, by sizing first cache system 118 so that first cache system 118 retains a quantity of data sufficient to satisfy a significant quantity of data requests (e.g., data request 20), the overall performance of storage system 12 may be enhanced.

Further, second cache system 120 within data array 122 may be sized so that the number of times that data tiers 102, 104, 106 are accessed may be reduced. Accordingly, by sizing second cache system 120 so that second cache system 120 retains a quantity of data sufficient to satisfy a significant quantity of data requests (e.g., data request 20), the overall performance of storage system 12 may be enhanced.

As discussed above, the instruction sets and subroutines of data tiering process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data tiering process 10 may be executed by one or more processors (not shown) and one or more memory architectures (not shown) included within data array 122.

A remote data tier (e.g., remote data tier 124) may be included within archive system 126 and may be utilized and accessible by data tiering process 10. Remote data tier 124 may utilize lower performance storage devices (e.g., SATA drives, SCSI drives, SAS drives, IDE drives, EIDE drives, and tape drives) and may be used primarily for archival/backup storage of data (as opposed to storing and serving active copies of data).

Figure 3:
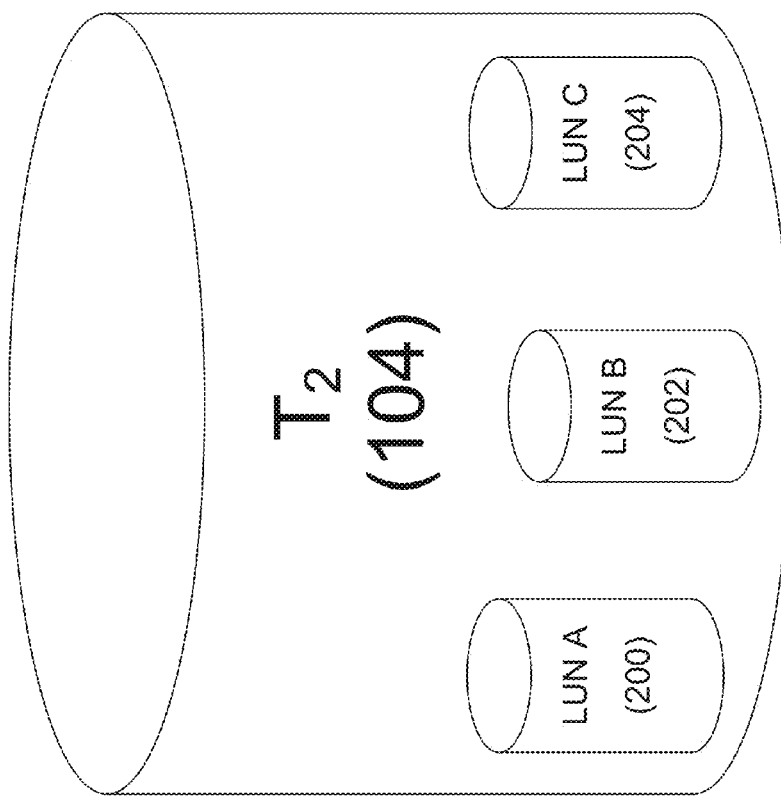
FIG. 3 is a diagrammatic view of a storage device and a plurality of logical storage devices mapped to the storage device.

The Data Tiering Process:

The various data tiers (e.g. data tiers 102, 104, 106) included within data array 122 may be divided into a plurality of LUNs (i.e., Logical Unit Numbers). As is known in the art, a LUN is a logical storage device that may be "constructed" from various physical portions of physical storage devices (such as those included within data tiers 102, 104, 106). For example and referring also to FIG. 3, data tier 104 may be logically divided to form e.g. three LUNs, namely LUN 200, LUN 202 and LUN 204.

As discussed above, data tiers 102, 104, 106 may be configured to provide various levels of performance, wherein one or more of data tiers 102, 104, 106 may be configured to be a lower performance data tier and one or more of data tiers 102, 104, 106 may be configured to be a higher performance data tier.

Accordingly, assume that LUN 200 contains quarterly accounting data that is (as would be expected) heavily accessed at the end of each yearly quarter yet not accessed during the rest of the year. Therefore, it may be desirable to have LUN 200 located within a higher performance data tier during the last week of each yearly quarter and, conversely, located within a lower performance data tier during the rest of the year. Data tiering process 10 may be configured to allow an administrator (e.g., user 46) of data tiering process 10 to ensure that LUN 200 is appropriately positioned (with respect to data tiers) at the appropriate times of the year.

Figure 4:
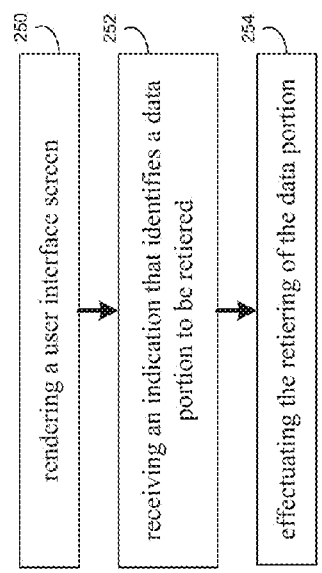
FIG. 4 is a first flow chart of the data tiering process of FIG. 1.

Referring also to FIGS. 4-5A, data tiering process 10 may render 250 user interface screen 300 that is accessible by user 46 of storage system 12. Via user interface screen, user 46 may select the data portion (e.g., LUN 200) to be retiered (e.g., within field 302), the future point-in-time (e.g., date and/or time) when the data portion (e.g., LUN 200) will be retiered (e.g., within field 304), the current data tier (e.g., within field 306) and the target data tier (e.g., within field 308). Once the fields are appropriately populated, user 46 may select "submit" button 310 using onscreen pointer 312 (which is controllable by e.g., a mouse (not shown)) to generate indication 64A that submits the appropriate information to data tiering process 10. Indication 64A may be received 252 by data tiering process 10, which identifies the data portion to be retiered (e.g., LUN 200) and the future point-in-time (e.g., date and/or time) when the data portion (e.g., LUN 200) is to be retiered amongst the plurality of data tiers.

The future point-in-time (as defined within field 304) may define a time and/or date at which the data portion will be uptiered (e.g., moved from a slower data tier to a faster data tier). Accordingly, if a data portion (e.g., LUN 200) is currently residing on a slower data tier (e.g., data tier 104) and activity is expected to increase, user 46 (via user interface 200) may schedule the data portion (e.g., LUN 200) to be moved to a faster data tier (e.g., data tier 102) prior to the expected activity increase.

Conversely, the future point-in-time (as defined within field 304) may define a time and/or date at which the data portion will be downtiered (e.g., moved from a faster data tier to a slower data tier). Therefore, if a data portion (e.g., LUN 200) is currently residing on a faster data tier (e.g., data tier 102) and activity is expected to fall off in the future, user 46 (via user interface 200) may schedule the data portion (e.g., LUN 200) to be moved to a slower data tier (e.g., data tier 104) after the expected activity decrease.

Additionally, the movement of data portions amongst data tiers need not be mono-directional and may be bidirectional. Therefore, the future point-in-time (as defined within field 304) may define a first time and/or date at which the data portion will be uptiered (e.g., moved from a slower data tier to a faster data tier) and a second time and/or date at which the data portion will be downtiered (e.g., moved from the faster data tier to the slower data tier). Accordingly, if a data portion (e.g., LUN 200) is currently residing on a slower data tier (e.g., data tier 104) and activity is expected to increase for one week, user 46 (via user interface 200) may schedule the data portion (e.g., LUN 200) to be moved to a faster data tier (e.g., data tier 102) prior to the expected activity increase and then be moved back to the slower data tier (e.g., data tier 104) after the expiry of the one week of expected high activity.

Continuing with the above-stated example in which LUN 200 contains quarterly accounting data that is heavily accessed for the last week of each yearly quarter and generally not accessed during the rest of the year, user 46 may (via user interface 300) select the data portion (e.g., LUN 200) to be uptiered (e.g., within field 302), the future point-in-time (e.g., date and/or time) when the data portion (e.g., LUN 200) will be uptiered (e.g., within field 304), the current data tier (e.g., within field 306) and the target data tier (e.g., within field 308). Once the fields are appropriately populated, user 46 may select "submit" button 310 using onscreen pointer 312 (which is controllable by e.g., a mouse (not shown)) to submit the appropriate information to data tiering process 10 (resulting in the generation of indication 64A, FIG. 1).

Additionally, user 46 may repeat the above-described process to define the point-in-time at which LUN 200 will be downtiered (e.g., from a fast data tier to a slower data tier) (as shown in FIG. 5B), resulting in the generation of indication 64B, FIG. 1.

Indications 64A, 64B may be received 252 by data tiering process 10, each of which identifies the data portion to be retiered (e.g., LUN 200) and the future point-in-time (e.g., date and/or time) when the data portion (e.g., LUN 200) is to be retiered amongst the plurality of data tiers.

Data tiering process 10 may process indications 64A, 64B chronologically in accordance with their defined points-in-time. Accordingly, data tiering process 10 may process indication 64A and effectuate 254 the uptiering of LUN 200 on 23 Jun. 2012 @ 12:00 a.m. from slower data tier 104 to faster data tier 102. Further, data tiering process 10 may subsequently process indication 64B and effectuate 254 the downtiering of LUN 200 on 1 Jul. 2012 @ 12:00 a.m. from faster data tier 102 to slower data tier 104.

While the system is described above as allowing for the manual (via user interface 300) retiering of various data portions amongst the above-described plurality of data tiers, other configurations are possible. For example, data tiering process 10 may be configured to monitor the usage of various data portions stored amongst the various data tiers so that the data portions may be automatically repositioned amongst the data tiers to enhance efficiency.

Figure 6:
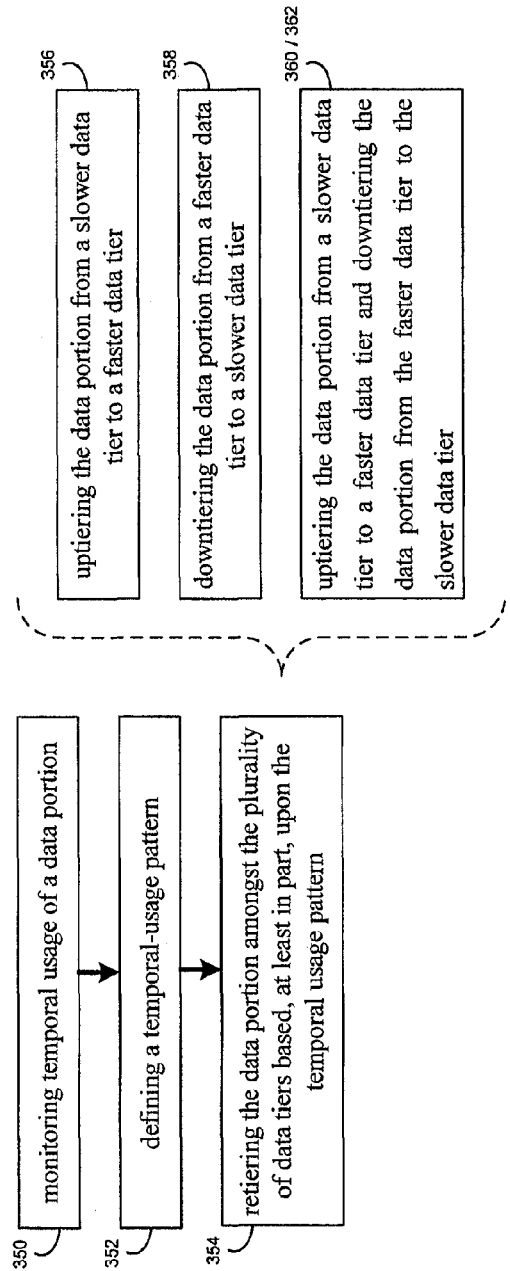
FIG. 6 is a second flow chart of the data tiering process of FIG. 1.

Accordingly and referring also to FIG. 6, data tiering process 10 may be configured to monitor 350 the temporal usage of a data portion (e.g., LUN 200) within a storage system (e.g., storage system 12) over a defined monitoring period. This defined monitoring period may be sized so that data tiering process 10 monitors the usage of the data portions for a period long enough to provide a high-level of temporal usage prediction, yet short enough so that movement of the data portions amongst the various data tiers does not take an overly long period of time.

For example, if the data portion being analyzed is utilized on a daily cycling basis, it will take a day to get each data point. Assuming that you want at least four data points to determine a temporal usage pattern, it may take four days to determine a pattern.

Further, if the data portion being analyzed is utilized on a weekly cycling basis, it will take a week to get each data point. Assuming that you want at least four data points to determine a temporal usage pattern, it may take four weeks to determine a pattern.

Additionally, if the data portion being analyzed is utilized on a quarterly cycling basis, it will take a quarter to get each data point. Assuming that you want at least four data points to determine temporal usage, it may take four quarters (i.e., a year) to determine a temporal usage pattern.

Upon data tiering process 10 monitoring 350 the temporal usage of a data portion (e.g., LUN 200) for a period of sufficient length (as discussed above), data tiering process 10 may define 352 a temporal-usage pattern for the data portion. As stated above, assume that LUN 200 contains quarterly accounting data that is heavily accessed at the end of each yearly quarter yet not accessed during the rest of the year. Accordingly, upon data tiering process 10 monitoring 350 the temporal usage of LUN 200 for a period of sufficient length (e.g., four quarters), data tiering process 10 may define 352 a temporal-usage pattern for LUN 200 (e.g., heavily accessed at the end of each yearly quarter yet not accessed during the rest of the year). Once such a temporal-usage pattern (as described above) is defined 352, data tiering process 10 may retier 354 LUN 200 amongst the plurality of data tiers based, at least in part, upon this temporal usage pattern.

When data tiering process 10 retiers 354 LUN 200, data tiering process 10 may uptier 356 the data portion from a slower data tier to a faster data tier included within the plurality of data tiers. Accordingly, if a data portion (e.g., LUN 200) is currently residing on a slower data tier (e.g., data tier 104) and activity is expected to increase, data tiering process 10 may uptier 356 data portion (e.g., LUN 200) to a faster data tier (e.g., data tier 102) in accordance with the above-discussed temporal usage pattern.

Additionally, when data tiering process 10 retiers 354 LUN 200, data tiering process 10 may downtier 358 the data portion from a faster data tier to a slower data tier included within the plurality of data tiers. Therefore, if a data portion (e.g., LUN 200) is currently residing on a faster data tier (e.g., data tier 102) and activity is expected to fall off in the future, data tiering process 10 may downtier 358 the data portion (e.g., LUN 200) to a slower data tier (e.g., data tier 104) in accordance with the above-discussed temporal usage pattern.

Further, when data tiering process 10 retiers 354 LUN 200, data tiering process 10 may uptier 360 the data portion from a slower data tier to a faster data tier and downtier 362 the data portion from the faster data tier to the slower data tier. Accordingly, if a data portion (e.g., LUN 200) is currently residing on a slower data tier (e.g., data tier 104) and activity is expected to increase for one week, data tiering process 10 may uptier 360 the data portion (e.g., LUN 200) to a faster data tier (e.g., data tier 102) and subsequently downtier 362 to the slower data tier (e.g., data tier 104) in accordance with the above-discussed temporal usage pattern.

Continuing with the above-stated example in which LUN 200 contains quarterly accounting data that is heavily accessed at the end of each yearly quarter (yet not accessed during the rest of the year), data tiering process 10 may retier 354 (i.e., uptier 360) LUN 200 on 23 Jun. 2012 @ 12:00 a.m. from e.g., slower data tier 104 to faster data tier 102. Further, data tiering process 10 may subsequently retier 354 (i.e., downtier 362) LUN 200 on 1 Jul. 2012 @ 12:00 a.m. from faster data tier 102 to slower data tier 104.

As discussed above, a remote data tier (e.g., remote data tier 124) may be included within archive system 126 and may be utilized and accessible by data tiering process 10. Remote data tier 124 may utilize lower performance storage devices (e.g., SATA drives, SCSI drives, SAS drives, IDE drives, EIDE drives, and tape drives) and may be used primarily for archival/backup storage of data (as opposed to storing and serving active copies of data).

For the following example, assume that LUN 202 contains yearly accounting data that is generated during the last week of December of each calendar year and is maintained for tax purposes only (i.e., not routinely accessed). Accordingly, user 46 may wish to archive LUN 202 to remote data tier 124.

Figure 7:
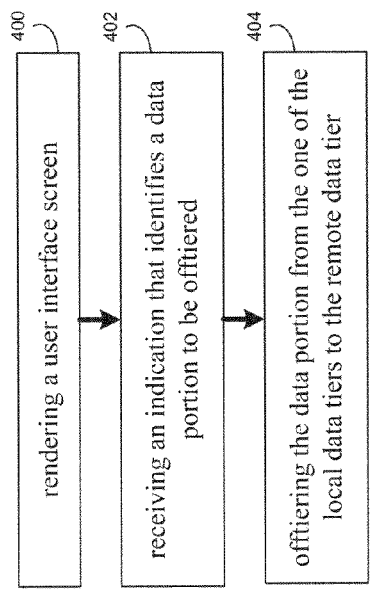
FIG. 7 is a third flow chart of the data tiering process of FIG. 1.

Accordingly and referring also to FIGS. 6-7, data tiering process 10 may render 400 user interface screen 450 that is accessible by user 46 of storage system 12. Via user interface screen 450, user 46 may select the data portion (e.g., LUN 202) to be offtiered (e.g., within field 452), the point-in-time (e.g., date and/or time) when the data portion (e.g., LUN 200) will be offtiered (e.g., within field 458), the current data tier (e.g., within field 454) and the target data tier (e.g., within field 456). Once the fields are appropriately populated, user 46 may select "submit" button 460 using onscreen pointer 312 (which is controllable by e.g., a mouse (not shown)) to generate indication 66 that submits the appropriate information to data tiering process 10. Indication 66 may be received 402 by data tiering process 10, which identifies the data portion to be offtiered (e.g., LUN 202) from one of the local data tiers (e.g., data tier 104) to the remote data tier (e.g., remote data tier 124).

Data tiering process 10 may process indication 66 and offtier 404 LUN 202 (as defined within field 452) from local data tier 104 (as defined within field 454) to remote data tier 124 (as defined within field 456). In accordance with this example, data tiering process 10 may effectuate the offtiering 404 of LUN 202 immediately (as defined within field 458).

While storage target 102 is described above as being included within data array 122, this is for illustrative purposes only and is not intended to be a limitation of this disclosure, as other configurations are possible and are considered to be within the scope of this disclosure. For example, storage target 102 may be included within a traditional computing system, such as a personal computer, a server computer, a series of server computers, a mini computer, and a mainframe computer.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   rendering a graphical user interface screen that is accessible by a user of a storage system, wherein the storage system includes a plurality of data tiers;
   receiving, via the graphical user interface screen, an indication that identifies a data portion to be retiered and a future point-in-time when the data portion will be retiered amongst the plurality of data tiers, wherein the future point-in-time is received from the user of the storage system via a data structure field included within the graphical user interface screen, wherein the graphical user interface screen includes a current data tier input field and a target data tier input field; and
   at the future point-in-time, effectuating the retiering of the data portion amongst the plurality of data tiers.

2. The computer-implemented method of claim 1 wherein the future point-in-time defines a time and/or date at which the data portion will be uptiered from a slower data tier to a faster data tier included within the plurality of data tiers.

3. The computer-implemented method of claim 1 wherein the future point-in-time defines a time and/or date at which the data portion will be downtiered from a faster data tier to a slower data tier included within the plurality of data tiers.

4. The computer-implemented method of claim 1 wherein the future point-in-time defines a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

5. The computer-implemented method of claim 1 wherein the plurality of data tiers include a first data tier, a second data tier, and a third data tier.

6. The computer-implemented method of claim 5 wherein the first data tier includes one or more flash storage devices, the second data tier includes one or more fiber channel storage devices, and the third data tier includes one or more SATA storage devices.

7. The computer-implemented method of claim 1 wherein the storage system includes a data array.

8. A computer program product residing on a computer readable medium having a plurality of instructions stored thereon which, when executed by a processor, cause the processor to perform operations comprising:
   rendering a graphical user interface screen that is accessible by a user of a storage system, wherein the storage system includes a plurality of data tiers;

receiving, via the graphical user interface screen, an indication that identifies a data portion to be retired and a future point-in-time when the data portion will be retired amongst the plurality of data tiers, wherein the future point-in-time is received from the user of the storage system via a data structure field included within the graphical user interface screen, wherein the graphical user interface screen includes a current data tier input field and a target data tier input field; and at the future point-in-time, effectuating the retiering of the data portion amongst the plurality of data tiers.

9. The computer program product of claim 8 wherein the future point-in-time defines a time and/or date at which the data portion will be uptiered from a slower data tier to a faster data tier included within the plurality of data tiers.

10. The computer program product of claim 8 wherein the future point-in-time defines a time and/or date at which the data portion will be downtiered from a faster data tier to a slower data tier included within the plurality of data tiers.

11. The computer program product of claim 8 wherein the future point-in-time defines a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

12. The computer program product of claim 8 wherein the plurality of data tiers include a first data tier, a second data tier, and a third data tier.

13. The computer program product of claim 12 wherein the first data tier includes one or more flash storage devices, the second data tier includes one or more fiber channel storage devices, and the third data tier includes one or more SATA storage devices.

14. The computer program product of claim 8 wherein the storage system includes a data array.

15. A computing system including at least one processor and at least one memory architecture coupled with the at least one processor, wherein the computing system is configured to perform operations comprising:

rendering a graphical user interface screen that is accessible by a user of a storage system, wherein the storage system includes a plurality of data tiers;

receiving, via the graphical user interface screen, an indication that identifies a data portion to be retired and a future point-in-time when the data portion will be retired amongst the plurality of data tiers, wherein the future point-in-time is received from the user of the storage system via a data structure field included within the graphical user interface screen, wherein the graphical user interface screen includes a current data tier input field and a target data tier input field; and at the future point-in-time, effectuating the retiering of the data portion amongst the plurality of data tiers.

16. The computing system of claim 15 wherein the future point-in-time defines a time and/or date at which the data portion will be uptiered from a slower data tier to a faster data tier included within the plurality of data tiers.

17. The computing system of claim 15 wherein the future point-in-time defines a time and/or date at which the data portion will be downtiered from a faster data tier to a slower data tier included within the plurality of data tiers.

18. The computing system of claim 15 wherein the future point-in-time defines a first time and/or date at which the data portion will be uptiered from a slower data tier to a faster data tier and a second time and/or date at which the data portion will be downtiered from the faster data tier to the slower data tier, wherein the slower data tier and the faster data tier are included within the plurality of data tiers.

19. The computing system of claim 15 wherein the plurality of data tiers include a first data tier, a second data tier, and a third data tier.

20. The computing system of claim 19 wherein the first data tier includes one or more flash storage devices, the second data tier includes one or more fiber channel storage devices, and the third data tier includes one or more SATA storage devices.

21. The computing system of claim 15 wherein the storage system includes a data array.

\* \* \* \* \*